(12) United States Patent
Nomura et al.

(10) Patent No.: US 10,248,489 B2
(45) Date of Patent: Apr. 2, 2019

(54) ELECTRONIC CONTROL UNIT (71) Applicant: DENSO CORPORATION, Kariya, Aichi-pref. (JP)

(72) Inventors: Syunsuke Nomura, Kariya (JP); Masayoshi Kondoh, Kariya (JP)

(73) Assignee: DENSO CORPORATION, Kariya (JP)

( * ) Notice: Subject to any disclaimer, the term of this patent is extended or adjusted under 35 U.S.C. 154(b) by 20 days.

(21) Appl. No.: 15/002,450

(22) Filed: Jan. 21, 2016

(65) Prior Publication Data
US 2016/0217024 A1 Jul. 28, 2016

(30) Foreign Application Priority Data

Jan. 23, 2015 (JP) .................................. 2015-11228

(51) Int. Cl.
*G06F 11/07* (2006.01)
(52) U.S. Cl.
CPC ........ *G06F 11/079* (2013.01); *G06F 11/0721* (2013.01); *G06F 11/0739* (2013.01)
(58) Field of Classification Search
CPC .. G06F 11/0739; G06F 11/079; G06F 11/263; G07C 5/0858; G07C 5/0816; G07C 5/085; G07C 5/006; G07C 5/0808; G07C 5/008
See application file for complete search history.

(56) References Cited

U.S. PATENT DOCUMENTS

| | | | | |
|---|---|---|---|---|
| 5,506,773 A | * | 4/1996 | Takaba | F02D 41/22 340/438 |
| 6,807,469 B2 | * | 10/2004 | Funkhouser | G07C 5/0808 340/438 |
| 8,306,688 B2 | * | 11/2012 | Nagata | F02D 41/22 701/29.1 |
| 2005/0043869 A1 | * | 2/2005 | Funkhouser | G07C 5/0808 701/33.4 |
| 2006/0089767 A1 | * | 4/2006 | Sowa | G01M 15/05 701/31.4 |
| 2009/0132117 A1 | * | 5/2009 | Kondoh | G06F 11/167 701/36 |
| 2010/0205450 A1 | * | 8/2010 | Sarnacke | G07C 5/0808 713/185 |
| 2010/0299023 A1 | * | 11/2010 | Okada | F02D 41/2493 701/33.4 |
| 2011/0304448 A1 | * | 12/2011 | Kawamura | G07C 5/0808 340/438 |

FOREIGN PATENT DOCUMENTS

| | | |
|---|---|---|
| JP | 2004-287549 A | 10/2004 |
| JP | 2007-239529 A | 9/2007 |

\* cited by examiner

*Primary Examiner* — Nadeem Iqbal
(74) *Attorney, Agent, or Firm* — Posz Law Group, PLC

(57) ABSTRACT

An electronic control unit has (i) a readiness storage area storing readiness indicating that an abnormality diagnosis for diagnosing an abnormality diagnosis item is complete, and (ii) a microcomputer clearing all readiness upon receiving an all clear request based on a condition that is different from a reception of the all clear request. In such configuration, the all clear request for clearing all readiness in the readiness storage area is appropriately handled by the electronic control unit.

7 Claims, 5 Drawing Sheets

ELECTRONIC CONTROL UNIT

CROSS REFERENCE TO RELATED APPLICATION

The present application is based on and claims the benefit of priority of Japanese Patent Application No. 2015-011228, filed on Jan. 23, 2015, the disclosure of which is incorporated herein by reference.

TECHNICAL FIELD

The present disclosure generally relates to an electronic control unit capable of performing an abnormality detection process for detecting an abnormality of a vehicle.

BACKGROUND INFORMATION

Generally, a vehicle nowadays has many electronic control units installed therein, and, among those electronic control units (ECUs), some have a self-diagnosis function for diagnosing an abnormality of the vehicle, which may be designated as On-Board Diagnostics (OBD). In recent years, OBD II standard is enacted, which is applicable to most of gasoline-engine vehicles and diesel-engine vehicles. According to the OBD II standard, the abnormality of the vehicle and the parts are diagnosable based on a regular monitoring of critical components and other conditions, such as an engine, an exhaust gas and the like.

The ECU stores information indicative of abnormality of a vehicle to a memory unit when diagnosis items are diagnosed as abnormal based on information of various sensors that are installed in a vehicle, which is then read out by a mechanic in charge by using an external device at a vehicle dealer, at a factory or the like. The read-out information is utilized for many purposes such as a repair of the vehicle, a replacement of the parts, or the like. See for example a patent document, Japanese Patent Laid-Open No. 2011-255862 (patent document 1).

When the self-diagnosis function is not properly functioning for some reasons, the abnormality of sensors or the like is not appropriately diagnosable. Therefore, the function of the abnormal sensor is configured to also be diagnosable as is (i.e., with the sensor being in an installed state in the vehicle), from an outside of the vehicle by using an external device or the like, and a state of performing the abnormality diagnosis of the sensors and other devices are stored in a memory unit.

For example, according to the OBD II standard, the abnormality diagnosis determination items and the abnormality diagnosis inspection items (i.e., designated as abnormality diagnosis items hereafter) are stored as readiness information in the memory unit when satisfied. In other words, when all items of the readiness information are stored as satisfied, the vehicle is shippable from a factory, or is returnable to a user from a repair shop or from a vehicle dealer.

The readiness information is erasable (i.e., completely cleared, or "all-cleared") by the external device (i.e., by a scan tool), according to the OBD II standard, which means the information is erasable/may be deleted from the memory unit. However, the readiness information is considered as complete only after all abnormality diagnosis items are satisfied. The ease of satisfying an abnormality diagnosis item is different from item to item, and the time required for the determination of the respective diagnosis items also varies from item to item. In other words, a certain diagnosis item may take a very long time to be determined as satisfied once the readiness information about such an item is cleared. Therefore, especially when ECU receives an all clear request for clearing readiness from the external scan tool in a shipping process of a factory or in a repair process of a vehicle dealer, such an all clear request must be appropriately handled.

SUMMARY

It is an object of the present disclosure to provide an electronic control unit which is capable of appropriately handling an all clear request for clearing readiness.

In an aspect of the present disclosure, the electronic control unit (ECU) includes a first storage unit storing readiness indicating that an abnormality diagnosis for diagnosing an abnormality diagnosis items is complete. The ECU also includes a clearing unit clearing all readiness from the first storage unit upon receiving an all clear request based on a condition that is different from a reception of the all clear request. According to the above-described aspect of the present disclosure, the clearing of all readiness becomes difficult, because the clearing of readiness is performed only when a certain other condition must be fulfilled besides receiving the all clear request.

Further, the all clear request for clearing all readiness is accepted and the clearing of all readiness is performed when the all clear request has already been received for a preset number of times or more before receiving a current all clear request, for example. In such configuration, the user intention for clearing all readiness is securely confirmed (i.e., the clearing of all readiness becomes difficult).

Further, the condition for clearing all readiness may also be whether a read-out request for reading permanent diagnosis information has already been received by ECU, for example. The permanent diagnosis information is information that is stored in a non-volatile manner in a second storage unit, and, when the user reads out the permanent diagnosis information, it suggests that the user has an intention of reading out the permanent diagnosis information, which is a hard-to-recover information and should not be erased very frequently or sporadically. Also, the all clear request after such read out of the permanent diagnosis information strongly suggests (i.e., confirms) the user intention of clearing all readiness. Therefore, it is appropriate that clearing all readiness is performed based on such condition.

Further, the condition for clearing all readiness may also be that a read-out request for reading out the readiness has not been received during a first preset amount of time after a reception of the all clear request for clearing the readiness, for example. In other words, when such a condition is fulfilled, it is determined that the user does not need to read out the readiness, which strongly suggests that the external user has an intention of clearing all readiness.

Further, the condition for clearing all readiness may also be that a request other than a read-out request for reading out the readiness has been received during a second preset amount of time after a reception of the all clear request for clearing the readiness, for example. Such a condition also suggests that the user does not need to read out the readiness, and suggests that the user has an intention of clearing all readiness.

In such manner, ECU can receive and handle the all clear request in an appropriate manner.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Figure 1:
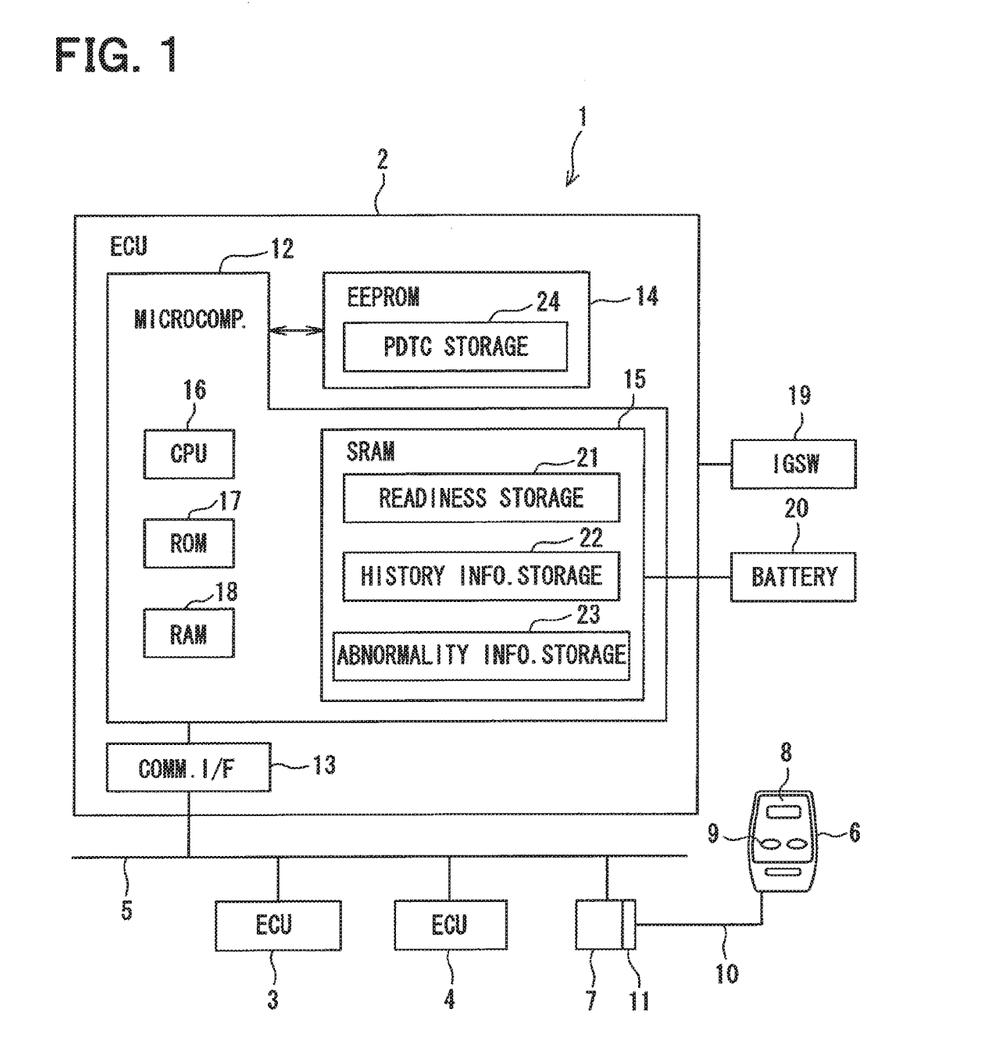
FIG. 1 is a block diagram of a communication system and an electronic control unit (ECU) in a first embodiment of the present disclosure.

Hereafter, the first embodiment of the electronic control unit is described based on the drawings. A communication system 1 shown in FIG. 1 is provided with electronic control units (ECU) 2-4, and is disposed in a vehicle, and ECU 2-4 are connected with each other in a two-way communication enabled manner via a communication line 5 of a vehicle network. The communication line 5 is also connected to a test port Data Link Connector (DLC) 7 that enables a connection of a scan tool 6 from an outside of the vehicle to the vehicle network.

The scan tool 6 has a liquid crystal display 8, buttons 9, a cable 10, a connector 11, and the like, for example, and is used by a worker of a vehicle factory or a vehicle dealer, when the connector 11 is connected to the test port 7 of the communication line 5. The buttons 9 are, for example, an all erase button, a part erase button, an OK button and the like.

ECU 2 responds to the scan tool 6 (i.e., sends abnormality diagnosis related information to the scan tool 6) via the communication line 5 in response to a command from the scan tool 6.

The scan tool 6 may, for example, perform a read-out and an erasure of diagnosis information (i.e., a Diagnosis Code: DTC) recorded on ECU 2, perform a light turn-off control of a warning lamp in the vehicle, a read-out of a Vehicle Identification Number (VIN), and a display of a state of a Malfunction Indicator Light (MIL).

ECU 2 is provided with a microcomputer 12 serving as a clearing unit, a communication interface 13, and Electrically Eraseable Programmable Read-Only Memory (EEPROM) 14 serving as a nonvolatile storage unit. The microcomputer 12 is provided with Central Processing Unit (CPU) 16 and memories (e.g., Read Only Memory (ROM) 17, Random Access Memory (RAM) 18, and Static Random-Access Memory (SRAM) 15 serving as a backup RAM, and various kinds of functions are realized according to a program memorized by the memory and executed by CPU 16. RAM 18 provides a workspace for an execution of a program by CPU 16.

SRAM 15 is a volatile memory that continuously receives a power supply from a battery 20 and keeps the memory contents without being affected by a turn ON and OFF of the ignition switch 19.

SRAM 15 has a storage area that is reserved for memorizing the abnormality related information. SRAM 15 is provided with a readiness storage area (i.e, a first storage) 21 that memorizes readiness, a history information storage area 22, and an abnormality related information storage area 23 that memorizes the diagnosis information (e.g., DTC), including the data when diagnosing an abnormality, or the like. In the drawing, the abnormality related information storage area 23 is shortened to "abnormality info. Storage," the history information storage area 22 is shortened to "history info. Storage," and the readiness storage area 21 are shortened to "readiness storage."

The readiness storage area 21 stores a readiness flag (i.e., abbreviated to "readiness" in the following description) that shows whether an abnormality diagnosis has been executed (i.e., complete/non-complete) for each type of the abnormality diagnosis processes that are performable by ECU 2, and also shows whether the abnormality diagnosis process is normal or abnormal.

For example, according to OBD II standard, an abnormality diagnosis determination item/an abnormality diagnosis inspection item (i.e., collectively designated Be abnormality diagnosis items hereafter) is predetermined for a continuous monitor object and a regular (i.e., intermittent) monitor object.

As an item for the continuous monitor object, a misfire, a fuel system, an exhaust gas control system (i.e., an Air/Fuel (A/F) sensor), etc., may be picked up for example, and as an item for a regular monitor object, an exhaust gas recirculation system, an O2 sensor and its heater, a catalyst device, an evaporative gas discharge control device (i.e., an evaporation system), a secondary air supply system, an air conditioning system, etc. may be picked up, for example.

When the abnormality diagnosis of each of these items is performed, and the abnormality diagnosis is completed by CPU 16 of the microcomputer 12, CPU 16 stores information that readiness is either normal or abnormal in the readiness storage area 21 of SRAM 15 as "readiness information."

The history information storage area 22 is an area that memorizes an abnormality diagnosis history at an execution time of the abnormality diagnosis processes, and the storage area 22 corresponds to the storage area 21 in terms of each type of the abnormality diagnosis processes performable by ECU 2. The abnormality diagnosis history may either be (i) a normal diagnosis history, or a normal history in short (i.e., a normal diagnosis result indicating that the diagnosed item is determined as normal) or (ii) an abnormal diagnosis history, or an abnormal history in short (i.e., an abnormal diagnosis result indicating that the diagnosed item is determined as abnormal).

The abnormality related information storage area 23 is provided as an area that stores and holds abnormality diagnosis related information as the data in which an execution result of abnormality diagnosis is shown in correspondence to readiness. The abnormality diagnosis related information is stored as three kinds of diagnosis result data representing that, as a result of diagnosis of each of the abnormality diagnosis items, i) abnormality found/existing, ii) no abnormality found/existing, or iii) existence of abnormality unknown, and, when the abnormality diagnosis related information is in a reset condition, the data of the abnormality diagnosis related information is set to "existence of abnormality unknown".

EEPROM 14 is a nonvolatile memory provided with a Permanent Diagnosis Information (PDTC) storage area (equivalent to a second storage unit) 24 for memorizing permanent diagnosis information as the information which should be permanently or everlastingly memorized from among the diagnosis information (DTC).

CPU 16 of the microcomputer 12 performs a preset vehicle control by executing the program memorized by the memory, and, in parallel with performing the preset vehicle control, operates as an abnormality diagnoser that performs the abnormality diagnosis of the vehicle control when the ignition switch 19 is turned ON by the vehicle user or the like and the vehicle is started.

Although the execution timing of the abnormality diagnosis process is different depending on the types of abnormality diagnosis, CPU 16 of the microcomputer 12 may perform the diagnosis process immediately after a turn ON of the ignition switch 19 at a vehicle start time, based on an output signal of the various sensors, or may perform the abnormality diagnosis process at a vehicle travel time based on an execution result of the vehicle control.

CPU 16 of the microcomputer 12 may also perform the abnormality diagnosis process based on the comparison between a previous vehicle state (i.e., an output signal from various sensors) and a current vehicle state (i.e., an output signal from various sensors), both of which may be stored in SRAM 15, when one driving cycle transits to the next (i.e., when the ignition switch 19 is turned OFF and then is turned ON again), which causes a transition of one driving cycle to the next cycle. That is, among many diagnosis items, some items take a long time (i.e., is difficult) to diagnose, while other items take only a short time to diagnose.

After executing each of the abnormality diagnosis items, CPU 16 of the microcomputer 12 sets, to SRAM 15, a readiness flag of each diagnosis item, which represents whether each of the abnormality diagnosis items has been executed/diagnosed (i.e., is complete).

Then, CPU 16 of the microcomputer 12 updates the memory contents of the abnormality information storage area 23 in SRAM 15 according to the contents of the abnormality diagnosis result. Further, the microcomputer 12 lights a warning indicator lamp, for example, for notifying a vehicle occupant about the abnormality when an abnormality is found by the diagnosis.

Further, when the user connects the scan tool 6 to the communication line 5, the microcomputer 12 performs an external request reception process. That is, the microcomputer 12 stands by until it receives a certain request from an external device via the communication interface 13, and, upon receiving a request signal, the microcomputer 12 performs a process according to the received signal.

The scan tool 6 is capable of outputting an all clear request to ECU 2, which requests a clearing of all readiness flags memorized by SRAM 15 of ECU 2.

The all clear request is a command outputted to the microcomputer 12 according to the user operation of the scan tool 6, and one all clear request is output according to one press of a button 9 on the scan tool 6 by the user, for example.

Figure 2:
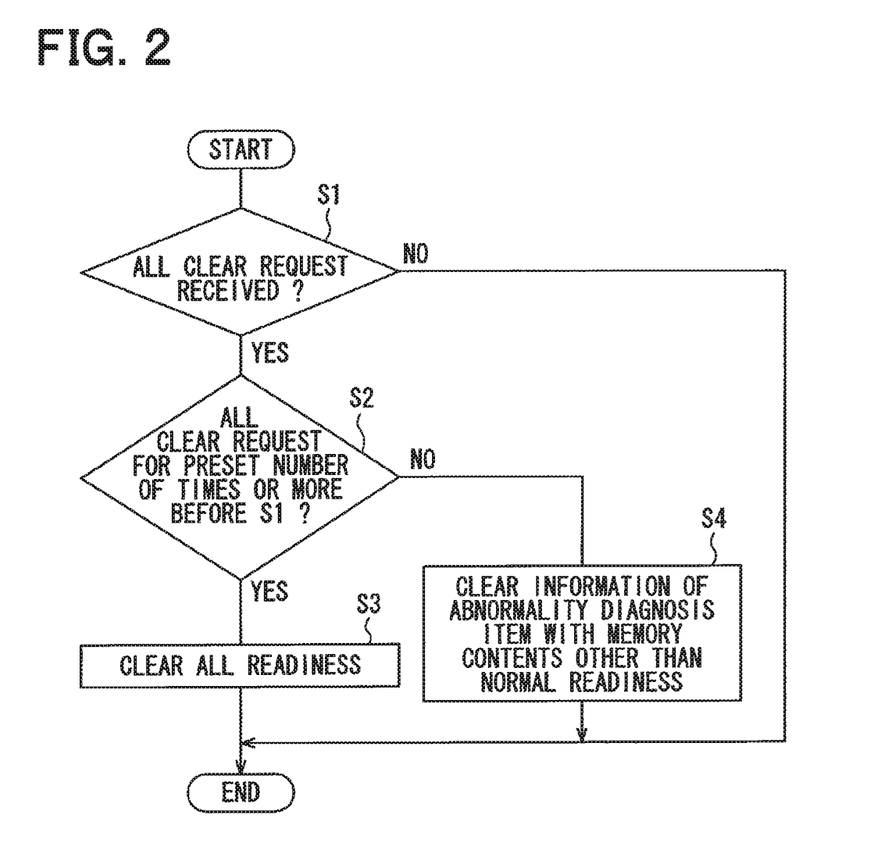
FIG. 2 is a flowchart of a process for handling readiness (performed by an ECU)

Hereafter, the action concerning the present embodiment is described. FIG. 2 shows a process that is performed by the microcomputer 12 when receiving an all clear request for clearing readiness. Normally, when the microcomputer 12 performs the abnormality diagnosis process, SRAM 15 memorizes a completion of readiness of the abnormality diagnosis items as a readiness flag, item by item.

When the scan tool 6 outputs the all clear request to ECU 2 according to user operation, the microcomputer 12 of ECU 2 receives the all clear request for clearing readiness.

When the microcomputer 12 receives the all clear request for clearing readiness (S1:YES), it is determined whether the all clear request has been received by a first preset number of times before (receiving the current request in) Step S1 (S2). In Step S2, it is determined whether, for example, a command representing the all clear request has been inputted from the scan tool 6 by the user (e.g., whether an all erase button 9 has been pressed).

The microcomputer 12 memorizes the number of all clear requests received by the microcomputer 12 in a memory, such as RAM 18 or the like, and, when the number of requests is equal to or greater than the preset value, the microcomputer 12 clears all readiness (S3). In such case, the microcomputer 12 determines that the user has an intention to clear, or erase, the information on all readiness, and acknowledges the all clear request, and erases all readiness.

Further, when the number of all clear requests received by the microcomputer 12 before receiving the all clear request in Step S1 is less than the first preset number (S2:NO), the microcomputer 12 clears, upon receiving the all clear request in Step S1, information of the abnormality diagnosis items other than the items having normal readiness (S4).

When the microcomputer 12 clears the information of the abnormality diagnosis items other than the items having normal readiness, the readiness of the abnormality diagnosis items having normal readiness is maintained (i.e., is kept un-erased), which frees the vehicle dealer worker from restrictions, in terms of saving time for re-satisfying normal readiness of such diagnosis items, for example.

As described above, according to the present embodiment, when the microcomputer 12 receives an all clear request for clearing readiness that is stored in the readiness storage area 21, the microcomputer 12 clears readiness, based on a condition that is different from receiving the all clear request. In other words, for clearing the readiness, a second condition has to be fulfilled besides fulfilling a first condition of receiving the all clear request, which makes it difficult to clear readiness.

The second condition for clearing readiness may be, for example, the all clear request has already been received by the microcomputer 12 for more than the preset number of times prior to the current all clear request in Step S1 By combining the first condition and the second condition for clearing readiness, the user intention for clearing readiness is securely confirmed, and making it hard to wrongly perform the readiness clearing. Therefore, ECU 2 is enabled to perform an appropriate process when receiving the all clear request.

Second Embodiment

Figure 3:
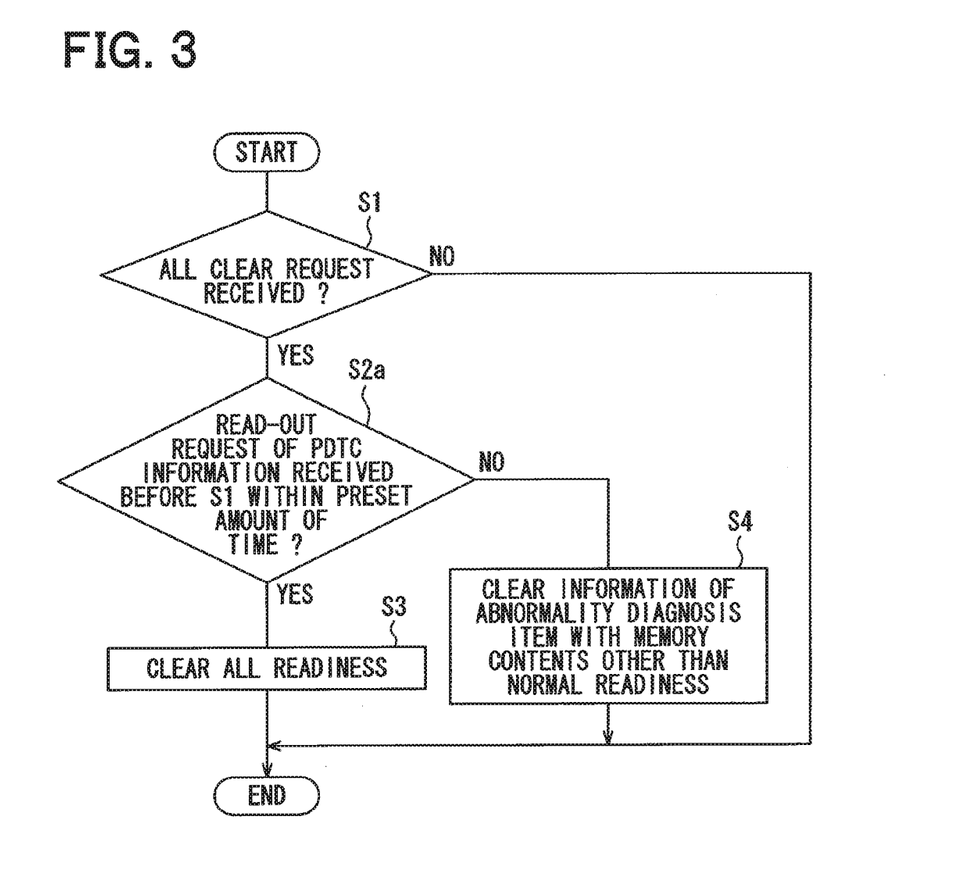
FIG. 3 is a flowchart of the process in a second embodiment of the present disclosure.

FIG. 3 shows a flowchart of a process in the second embodiment of the present disclosure. The difference of the second embodiment from the first embodiment is that Step S2 in FIG. 2 is replaced with Step S2a of FIG. 3, which is a condition for clearing all readiness based on a read-out request for reading out PDTC already received by ECU 2.

That is, when the scan tool 6 outputs the all clear request to ECU 2 according to the user operation, the microcomputer 12 of ECU 2 receives the all clear request. When the microcomputer 12 receives the all clear request (S1:YES), it is determined whether the read-out request of PDTC information has been received within a preset amount of time before the process of Step S1 (S2a). On condition that this determined result is satisfied (S2a:YES), the all clear request is acknowledged, and all readiness is erased (S3). When the read-out request of PDTC information has not been received (S2a:NO), the information on abnormality diagnosis items other than the item having normal readiness is cleared (S4).

As mentioned above, PDTC information is memorized by EEPROM 14 as the information that should be everlastingly and permanently memorized among the diagnosis information. When the microcomputer 12 has received the read-out request for reading the PDTC information in Step S2a within a preset amount of time before the process of Step S1, the microcomputer 12 can confirm that the user has an intention of performing a high priority operation immediately before Step S1, which strongly suggests that the user is aware of what he/she is doing. Therefore, the all clear request in Step S1 is acknowledged, and all readiness is erased.

Further, when the number of all clear requests received by the microcomputer 12 before receiving the all clear request in Step S1 is less than the first preset number (S2:NO), the microcomputer 12 clears, upon receiving the all clear request in Step S1, information of the abnormality diagnosis items other than the items having normal readiness (S4).

When the microcomputer 12 clears the information of the abnormality diagnosis items other than the items having normal readiness, the readiness of the abnormality diagnosis items having normal readiness is maintained (i.e., is kept un-erased), which frees the vehicle dealer worker from restrictions, in terms of saving time for re-satisfying normal readiness of such diagnosis items, for example.

When the user reads out the permanent diagnosis information by operating the button 9, it is interpreted by the microcomputer 12 that the user has an intention of reading out the permanent diagnosis information, which is a hard-to-recover information and should not be erased very frequently or sporadically, and, based on such an interpretation, the all clear request after such a read out of the permanent diagnosis information is also understood (i.e., interpretable), as a user intention for clearing all readiness. Therefore, by examining a fulfillment of the above condition, the user intention of clearing all readiness is confirmed.

The second embodiment achieves the same or similar effects as the above-mentioned embodiment, and ECU 2 is enabled to perform an appropriate process when receiving the all clear request.

Third Embodiment

Figure 4:
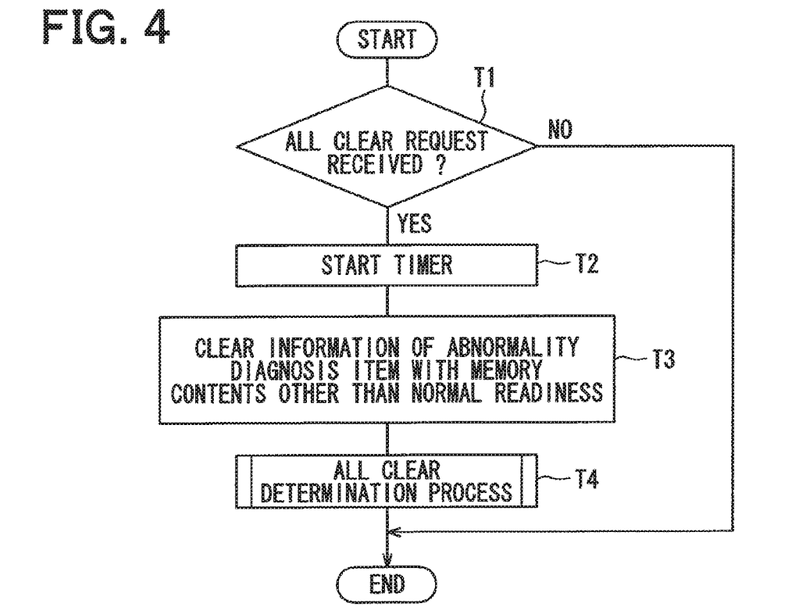
FIG. 4 is a flowchart (i.e., part 1) of the process in a third embodiment of the present disclosure.
Figure 5:
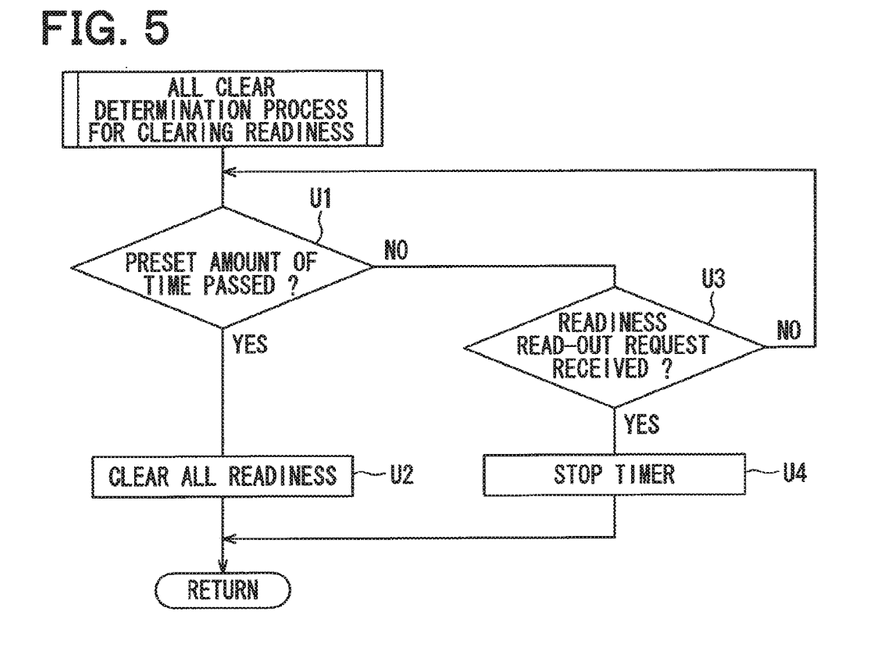
FIG. 5 is a flowchart (i.e., part 2) of the process in the third embodiment of the present disclosure.

FIGS. 4 and 5 show a flowchart of a process in the third embodiment of the present disclosure. The difference of the third embodiment from the first and second embodiments is that in the third embodiment, the clearing of all readiness is performed based on a condition that a read-out request for reading out readiness is not received within a first preset time from the reception of the all clear request.

That is, when the scan tool 6 outputs the all clear request to ECU 2 according to the user operation, the microcomputer 12 of ECU 2 receives the all clear request (T1). When the microcomputer 12 receives the all clear request (T1: YES), the microcomputer 12 than starts the timer (T2). The time measurement by the timer is performed in order to determine and confirm what the next user operation is within a preset amount of time from the reception of the all clear request. Then, in Step T3, the microcomputer 12 clears the information of the abnormality diagnosis items other than the items having normal readiness. That is, after Step T3, the information of the abnormality diagnosis items having normal readiness is maintained, (i.e., is left un-erased). Then, the microcomputer 12 performs an all clear determination process for clearing readiness shown in FIG. 5 (U1-U4).

The microcomputer 12 determines in Step U1 whether a first preset time has elapsed, and, on condition that the first preset time has elapsed, all readiness is cleared in Step U2. The first preset time may be set to 5 seconds, for example.

On the contrary, when the read-out request for reading out readiness is received (U3:YES), the microcomputer 12 temporarily stops the timer (U4), and finishes the all clear determination process without clearing all readiness (i.e., without erasing the items that are left un-erased in Step T3).

According to the present embodiment, the microcomputer 12 interprets a YES determination in Step U3 to indicate that a user intends not to erase readiness. As a result, the information of the abnormality diagnosis items having normal readiness remains (i.e., is kept un-erased), which frees the vehicle dealer worker from restrictions, in terms of saving time for re-satisfying normal readiness of such diagnosis items, for example.

Further, the clearing of all readiness is performed based on a condition that a read-out request for reading out readiness is not received within a first preset time from the reception of the all clear request, which is interpretable as read-out of readiness not required. As a result, the microcomputer 12 is enabled to confirm that the user intends to clear readiness.

The third embodiment achieves the same or similar effects as the above-mentioned embodiments, and ECU 2 is enabled to perform an appropriate process when receiving the all clear request.

Fourth Embodiment

Figure 6:
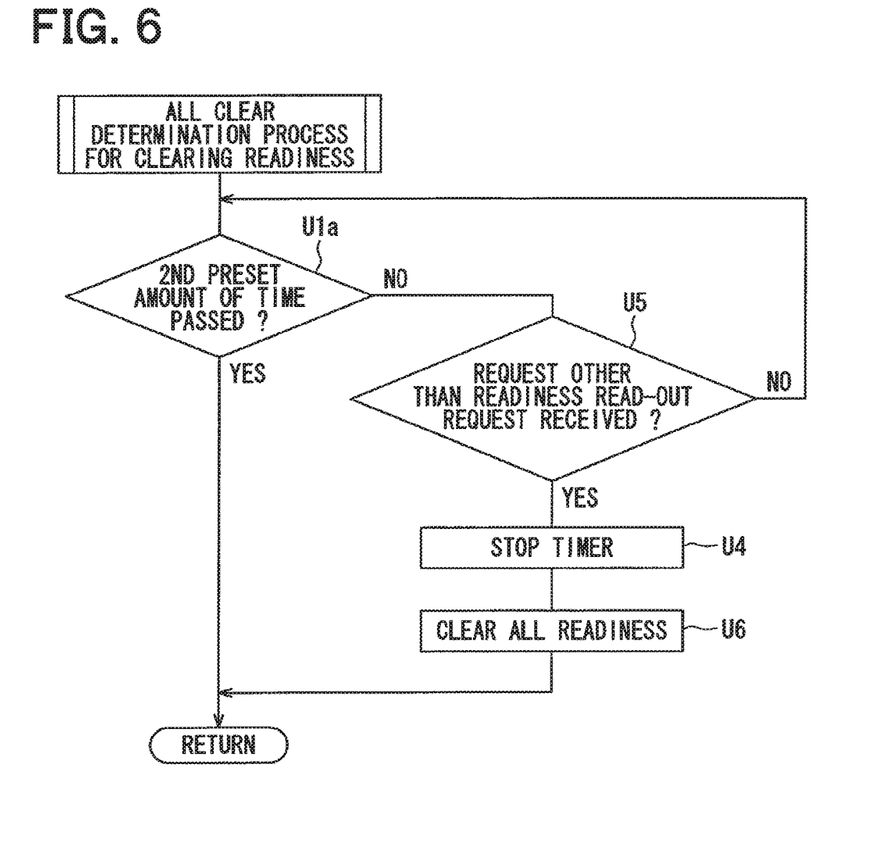
FIG. 6 is a flowchart of the process in a fourth embodiment of the present disclosure.

FIG. 6 shows a flowchart of the process in the fourth embodiment of the present disclosure. The difference of the fourth embodiment from the third embodiment is that the clearing of all readiness is performed based on a condition that a request other than the read-out request for reading out readiness is received within a second preset time from the reception of the all clear request for clearing readiness.

In the present embodiment, the same process shown in FIG. 4 regarding the third embodiment is used. That is, when the scan tool 6 outputs the all clear request to ECU 2 according to the user operation as shown in FIG. 4, the microcomputer 12 of ECU 2 receives the all clear request (T1). When the microcomputer 12 receives the all clear request (T1:YES), the microcomputer 12 then starts the timer (T2). Then, in Step T3, the microcomputer 12 clears the information of the abnormality diagnosis items other than the items having normal readiness. That is, after Step T3, the information of the abnormality diagnosis items having normal readiness is maintained (i.e., is left un-erased). Then, the microcomputer 12 performs an all clear determination process for clearing readiness shown in FIG. 6 (U1a-U6).

The microcomputer 12 determines in Step U1a whether a second preset time has elapsed, and on condition that the second preset time has elapsed, the microcomputer 12 finished the all clear determination process. The second preset time may be the same (i.e., 5 seconds) as the first preset time of the third embodiment, or may be different from the first preset time.

The microcomputer 12 interprets that a YES determination in Step U1a indicates a user intention of not erasing readiness. As a result, the information of the abnormality diagnosis items having normal readiness remains (i.e., is kept un-erased).

Otherwise (i.e., the microcomputer determines in Step U1a that the second preset time has not elapsed), the microcomputer 12 determines whether a request other than the read-out request for reading readiness is received from the external device (i.e., from the scan tool 6) (U5). The microcomputer 12 temporarily stops the timer, on condition that a request other than the read-out request is received (U4), and clears all readiness (U5).

A request other than the read-out request for reading out readiness may be, for example, a request of information about a vehicle state such as an engine rotation number, a vehicle speed, a battery voltage (VB), or the like.

In other words, the process in the present embodiment assumes that, when the user has an intention of clearing readiness, the user performs other operations other than the read-out operation for reading out readiness (i.e., keeps on requesting other things other than the read-out of readiness), after the all clear request. That is, when a user operation other than the read-out operation is performed, such an operation is interpreted as a user intention of clearing readiness. As a result, the clearing of all readiness is performed (U6).

According to the present embodiment, the microcomputer 12 clears all readiness on condition that a request other than the read-out request for reading out readiness is received within the second preset amount of time after the reception of the all clear request for clearing readiness. Therefore, such a transition of requests, (i.e., a transition from the all clear request to a request other than the read-out request) is interpretable as the read-out of readiness not required by the user. In other words, the user has an intention of clearing all readiness.

The fourth embodiment achieves the same or similar effects as the above-mentioned embodiments, and ECU 2 is enabled to perform an appropriate process when receiving the all clear request.

Other Embodiments

Although the present disclosure has been described in connection with preferred embodiment thereof with reference to the accompanying drawings, it is to be noted that various changes and modifications will become apparent to those skilled in the art.

For example, the scan tool 6 described in the above as sending out one request per one operation of the button 9 may be configured differently. That is, the button 9 of the scan tool 6 may be operated once for sending out two or more requests. Alternatively, the button 9 of the scan tool 6 may be operated twice or more for sending out one request.

According to the second embodiment, the reception of the read-out request for reading out the PDTC information is described as being bound by a condition of within a preset amount of time before the process of Step S1. However, the reception condition for receiving the read-out request may be other than the above.

According to the above embodiments, various information (e.g., readiness, history information, abnormality related information, etc.) is stored in SRAM 15, which serves as a backup RAM. However, the storage of information is not necessarily limited to SRAM 15. For example, at least a part of the information may be stored in a non-volatile memory (e.g., in EEPROM).

Such changes, modifications, and summarized scheme are to be understood as being within the scope of the present disclosure as defined by appended claims.

What is claimed is:

1. An electronic control unit for a vehicle comprising:
   a first storage unit configured to store a readiness flag indicating that an abnormality diagnosis for an abnormality diagnostic item is complete;
   a second storage unit configured to store permanent diagnostic (PDTC) information in a non-volatile manner; and
   a microcomputer configured to
      communicate with a data scan tool, wherein the scan tool is external to a vehicle network and connects to the vehicle network to communicate with the microcomputer via a data link connector in the vehicle,
      determine whether a current all clear request is received from the vehicle data scan tool, which requests clearing of all readiness flags in the first storage unit,
      determine whether an additional condition that is different from the current all clear request is fulfilled in which the additional condition includes that the microcomputer receives a read-out request from the scan tool for reading out the permanent diagnostic information stored in the second storage unit, and
      clear all readiness flags in the first storage unit in response to determining both that the current all clear request from the scan tool is received and the additional condition including the read-out request from the scan tool for reading out the permanent diagnostic information stored in the second storage unit is fulfilled.

2. The electronic control unit of claim 1, wherein
   the additional condition further includes the microcomputer receiving a preset number of prior all clear requests from the scan tool prior to receiving the current all clear request.

3. The electronic control unit of claim 1, wherein
   the additional condition further includes the microcomputer waiting a preset amount of time to receive a read out request from the scan tool for reading out the readiness flag, and
   clearing all readiness flags if the read out request has not been received, after the microcomputer receives the current all clear request.

4. The electronic control unit of claim 1, wherein
   the additional condition further includes the microcomputer waiting a preset amount of time to receive an additional request from an external device, the additional request other than a read out request from the scan tool for reading out the readiness flag, and
   clearing all readiness flags if the additional request has been received, after the microcomputer receives the current all clear request.

5. The electronic control unit according to claim 1, wherein
   the microcomputer is configured to perform on-board diagnostics of a vehicle.

6. The electronic control unit according to claim 5, wherein
   the microcomputer is configured to detect the abnormality diagnostic item during the on-board diagnostics.

7. An electronic control unit (ECU) disposed in a vehicle, the ECU for controlling deletion of readiness flags, the ECU comprising:
   a first memory configured to store one or more readiness flags indicating that an abnormality diagnosis for an abnormality diagnostic item is complete;
   a second memory configured to store permanent diagnostic (PDTC) information, the second memory a non-volatile-type memory; and
   a microcomputer configured to
      communicate with a scan tool, wherein the scan tool is external to a vehicle network and connects to the vehicle network to communicate with the microcomputer via a data link connector in the vehicle, determine whether an all clear request for deleting the one or more readiness flags stored in the first memory has been transmitted by the scan tool to the microcomputer;

determine whether an additional condition for clearing the one or more readiness flags stored in the first memory has been fulfilled, wherein the additional condition includes determining whether an amount of prior all clear requests transmitted by the scan tool to the microcomputer exceeds a preset amount, and clear the one or more readiness flags in the first memory when both the all clear request is received and the amount of prior all clear requests exceeds the preset amount.

\* \* \* \* \*